(12) United States Patent
Drummond-Murray et al.

(10) Patent No.: US 6,442,161 B1
(45) Date of Patent: Aug. 27, 2002

(54) DATA PACKET TRANSMISSION

(75) Inventors: Justin Drummond-Murray, Chorleywood; David Law, Kempston; Rob Parry, Watford, all of (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/122,821

(22) Filed: Jul. 27, 1998

(30) Foreign Application Priority Data

Jun. 5, 1998 (GB) .............................................. 9812197

(51) Int. Cl.[7] .............................................. H04L 12/56
(52) U.S. Cl. ........................................ 370/389; 370/252
(58) Field of Search ................................. 370/252, 389, 370/395; 714/52, 48, 774, 786, 768, 752

(56) References Cited

U.S. PATENT DOCUMENTS

| 5,410,546 A | * | 4/1995 | Boyer et al. | |
| 5,428,629 A | | 6/1995 | Gutman et al. | 371/37.1 |
| 5,935,268 A | * | 8/1999 | Weaver | 714/758 |
| 6,038,694 A | * | 3/2000 | Swallow | 714/781 |
| 6,252,888 B1 | * | 7/2001 | Fite, Jr. et al. | 370/466 |

FOREIGN PATENT DOCUMENTS

| EP | 0366589 A2 | | 5/1990 | H04L/1/00 |
| WO | WO 99/00737 | * | 1/1999 | |

* cited by examiner

*Primary Examiner*—Douglas Olms
*Assistant Examiner*—Ken Vanderpuye
(74) *Attorney, Agent, or Firm*—McDonnell Boehnen Hulbert & Berghoff

(57) ABSTRACT

A network in which a data packet is altered, for instance by the insertion or removal of a data portion such as a VLAN tag. The data of the data packet is read out of memory to an output means which forms the altered data packet with a new FCS portion and to a checking means which checks the integrity of the input packet using the existing FCS. The possibility for discrepancies to occur between the data supplied to the output and checking means is reduced.

9 Claims, 2 Drawing Sheets

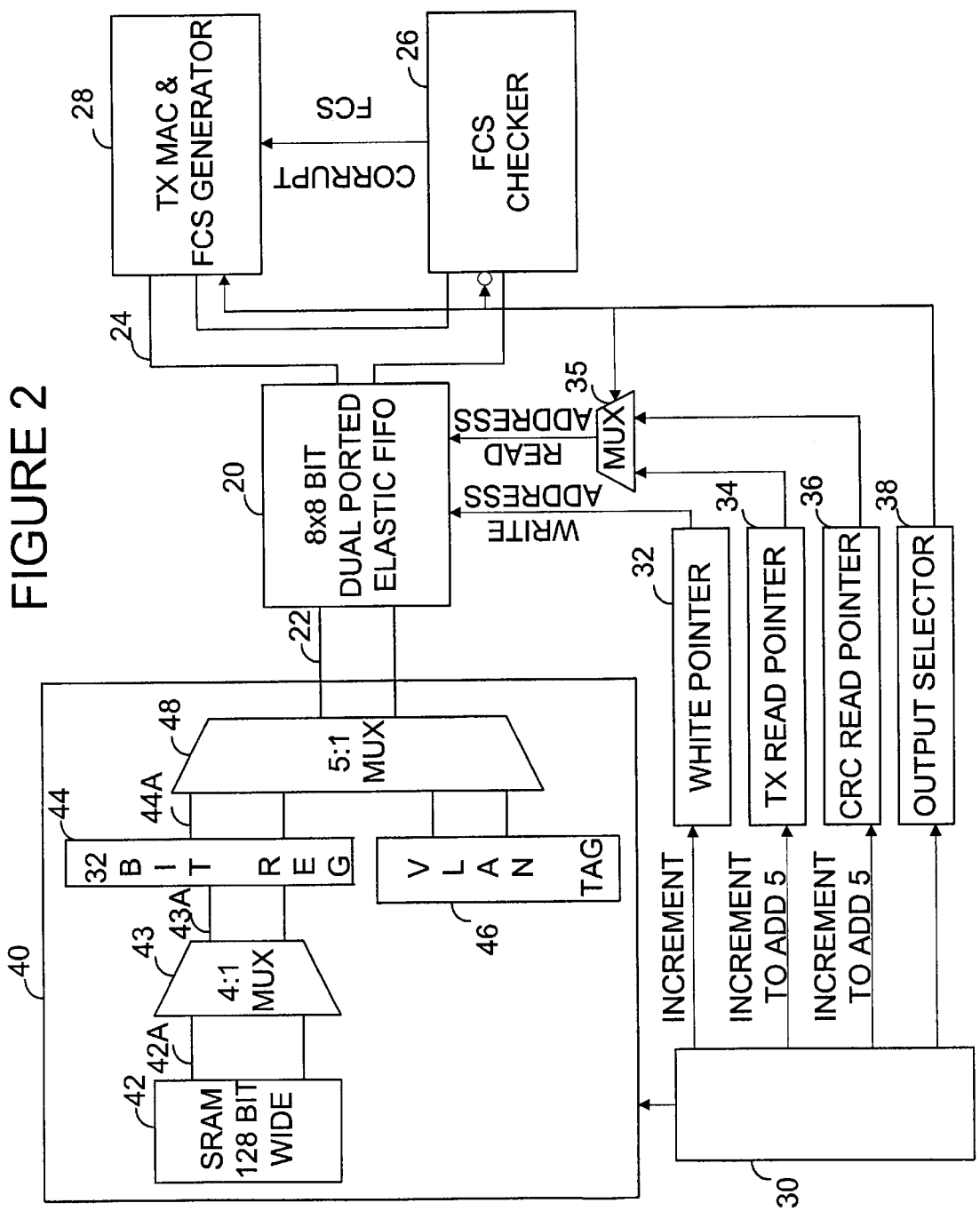

DATA PACKET TRANSMISSION

BACKGROUND OF THE INVENTION

1. Field of the Invention

The present invention relates to the transmission of data packets in computer networks and in particular to the proper forwarding of such data packets the content of which may have been intentionally changed.

2. Prior Art

It is well known in computer networks for devices connected to the network to communicate with each other by sending data to each other in the form of data packets. The precise content of each packet will depend upon the communication protocol in operation but typically each data packet may contain a destination address identifying the intended recipient of the data packet, a source address identifying the sender of the packet, and the data itself Additionally, there may be protocol specific sections of the data packet, for instance in the Ethernet protocol each data packet typically contains a type identifier indicating for instance the type of packet which is being transmitted or the length of the data section of the packet. Finally, there is usually provided at the end of the data packet a sequence of bits enabling error detection to be carried out.

In particular, this sequence of bits, which is commonly known as a frame check sequence (FCS), is a sequence of bits generated by performing some mathematical algorithm or procedure on all of the bits forming the rest of the data packet. On receipt of the data packet, the receiving station can check for errors which may have occurred during transmission of the packet by performing the appropriate mathematical algorithm or procedure on the data packet as received and comparing this to the received FCS. If there is a difference in this comparison the received data packet is discarded as containing an error.

In computer networks the network devices are not connected directly to each other and the data packets which are sent as described above in fact travel via a number of communication hubs which function to receive and retransmit the packet to enable the packets to travel throughout the network. There are certain types of communications hub, such as bridges, switches and routers, which have a certain amount of intelligence such that the packets they receive are retransmitted only on the route or routes necessary to enable the received packet to reach its intended destination. To achieve this, such hubs have some memory to enable the data packet to be received into memory and held while the required analysis of the destination takes place before being retransmitted.

This temporary storage of the data packet enables the communications hub also to make modifications to the data packet if this is required. Such modifications may be made in circumstances where for instance the hub is at an interface between two network segments operating slightly different network protocols or supporting different network features. The modifications would generally not affect the data portion of the packet or probably the destination or source address of the packet. However, the type identifier mentioned above may be altered or additional sections may be inserted into the packet specific to the protocol via which the packet is to be transmitted. Equally, upon reaching the end of the particular network segment in question, the inserted data must be removed from the data packet or the data packet must be otherwise restored to its original condition. One particular circumstance in which data packets may be altered in this fashion is on being passed to a portion of a computer network which supports virtual LANs (VLANs) in which case it is necessary to insert a portion of data known as a VLAN tag into the data packet and to remove it when the packet leaves the portion of the network which supports this feature.

The present invention is not directly concerned with the reasons or mechanisms for altering the data packets in this way, although in the specific embodiment described later on a mechanism of inserting and removing a VLAN tag will be described. Rather, the present invention is related to the problems created in relation to the FCS when the packet is altered as outlined above.

It will be appreciated that whenever the overall content of the data packet changes the FCS at the end of the data packet must also be changed if it is to remain consistent with the content of the packet itself. However, in a circumstance where a packet is to be altered as outlined above it is also necessary to check the current FCS for correspondence with the existing data packet in order to detect any errors, before discarding the FCS and replacing it with the new one.

There have previously been proposed methods for dealing with the requirement to change the FCS when the content of the data packet changes but these have exhibited certain problems. For instance, it has been proposed simply to recalculate the FCS without checking the integrity of the received data and just transmitting the altered packet with a good FCS on the assumption that a packet containing an error would have been dropped before it reached the point at which the packet was altered. Such methods do not taken into account the possible corruption of a packet while it is being handled in the device performing the alteration to the packet. For instance, a good packet could be corrupted while being stored in the memory. A good FCS would then be appended to a bad packet and a receiving device would accept the packet and try to treat the corrupted data as valid data.

A second previously proposed method uses a multiplexer to control the flow of data to the transmission section of the communications hub and another data path to check the previous FCS. However, the generation in this scheme of two data paths raises the possibility that data corruption may occur on the transmit path which would not be detected on the checking path and this would result in the same difficulties as mentioned above. In this scheme, there is also a considerable delay introduced in the transmit path in the case that a section of the packet is being removed, for instance a VLAN tag. In this case, the FCS checker still needs to process the removed bits along with the original FCS before the transmission can be completed with the new FCS. Typically this introduces a requirement for 64 bits of delay into the transmission path, reflecting the sizes of the original FCS and VLAN tag being 32 bits.

A third general approach to the problem mentioned above is to use a mathematical algorithm to calculate the position of the change in the data in the packet and applying a corresponding offset to the existing FCS to correct it for the modified packet. This solution however requites complex mathematical calculation to be carried out on the asserted data and the existing packet and the additional results. This process involves calculating several FCSs using different parts of the packet along with various masks and is very gate intensive when implemented in hardware.

SUMMARY OF THE INVENTION

The present invention provides apparatus for the alteration and output of an input data packet in a computer network, the data packet comprising communication data, and check data, the check data bearing a predetermined relationship to the communication data whereby integrity of the data packet can be checked; the apparatus comprising:

means arranged to alter the communication data of an input data packet;

storage means arranged to store said data packet such that said communication data may be output from said storage means in either its un-altered or altered condition;

output means arranged to receive from said storage means said communication data in its altered condition, to determine new check data on the basis of said communication data in its altered condition, and to output said communication data in its altered condition and said new check data as an output data packet; and checking means arranged to receive from said storage means said communication data in its unaltered condition and said check data of said input packet, to determine whether said received check data bears said predetermined relationship to said un-altered communication data, and to give an indication, if it does not, to said output means;

said output means being further arranged to corrupt said output data packet if said indication is received.

In this arrangement it is the same data, that is the data output from the storage means, which both forms the new data packet and is the basis for the data integrity check. The possibility for the data received by the output means and by the checking means to differ is very small and therefore the likelihood of corrupt data being output in an apparently un-corrupt output packet is largely reduced.

Preferably timing means controls the relative timing of the output of data from said storage means to said output means and to said checking means such that said indication, if given by said checking means, occurs prior to the completion of the determination of said new check data;

Also, in a preferred embodiment the storage means comprises a first memory device arranged to store said data packet in its un-altered condition, and a second memory device having a plurality of memory locations into which data is written cyclically such that the existing data is sequentially over-written by new data and from which data can be read from desired ones of said memory locations; and further comprising control means arranged to control the operation of the storage means such that the data of the unaltered data packet stored in said first memory device together with any additional data introduced by said means arranged to alter the communication data is read sequentially into said second memory device, and to control the locations from which data is read out from said second memory device to said output means and to said checking means such that the communication data of the data packet is received in its altered condition by said output means and in its un-altered condition by said checking means.

In the preferred embodiment described later, the alteration which is made to the data packet is the insertion or removal of a predetermined portion of data (eg. VLAN tag) at a predetermined location in the communication data.

For the removal of such a data portion the invention provides apparatus for the alteration and output of an input data packet in a computer network, the data packet comprising communication data and check data, the check data bearing a predetermined relationship to the communication data whereby integrity of the data packet can be checked; the apparatus comprising:

storage means arranged to store said input data packet;

output means arranged to receive from said storage means said communication data of said input data packet with the exception of a predetermined portion of said communication data to form new communication data, of an output data packet, and to determine new check data on the basis of said new communication data to complete said output data packet; and checking means arranged to receive from said storage means said communication data and check data of said input data packet, to determine whether said received check data bears said predetermined relationship to said communication data, and to give an indication, if it does not, to said output means;

said output means being further arranged to corrupt said output data packet if said indication is received.

For the insertion of such a data portion the invention provides apparatus for the alteration and output of an input data packet in a computer network, the data packet comprising communication data and check data, the check data bearing a predetermined relationship to the communication data whereby integrity of the data packet can be checked; the apparatus comprising:

storage means arranged to store said input data packet and a further data portion to be inserted into the communication data of said input data packet at a predetermined location;

output means arranged to receive from said storage means said communication data of said input data packet with said data portion inserted at said predetermined location to form new communication data of an output data packet, and to determine new check data on the basis of said new communication data to complete said output data packet; and checking means arranged to receive from said storage means said communication data and check data of said input data packet, to determine whether said received check data bears said predetermined relationship to said communication data, and to give an indication, if it does not, to said output means;

said output means being further arranged to corrupt said output data packet if said indication is received.

In the preferred embodiment, the above two defied apparatus have a pair of read pointers controlling the output from the storage means, the relative positions of the read pointers being controller such that the data as defined above is read out to the output and checking means.

This invention therefore provides a simple but effective technique for the alteration of data packets as described.

BRIEF DESCRIPTION OF THE DRAWINGS

This invention will be better understood from the following description of a preferred embodiment given by way of example and with reference to the accompanying drawings, in which FIG. 2 illustrates apparatus arranged to implement a preferred embodiment of this invention.

DETAILED DESCRIPTION OF THE DRAWINGS

In broad terms, the following description is of a network in which a data packet is altered, for instance by the insertion or removal of a data portion such as a VLAN tag. The data of the data packet is read out of memory to an output means which forms the altered data packet with a new FCS portion and to a checking means which checks the integrity of the input packet using the existing FCS. The possibility for discrepancies to occur between the data supplied to the output and checking means is reduced.

FIG. 1 illustrates the format of a data packet and how it may be altered such that problems addressed by this invention arise. In particular, the description that follows and the preferred embodiment are based on the Ethernet protocol, although this invention is equally applicable to other protocols in which data is transmitted in packets and subject to alteration at particular locations.

Figure 1A:
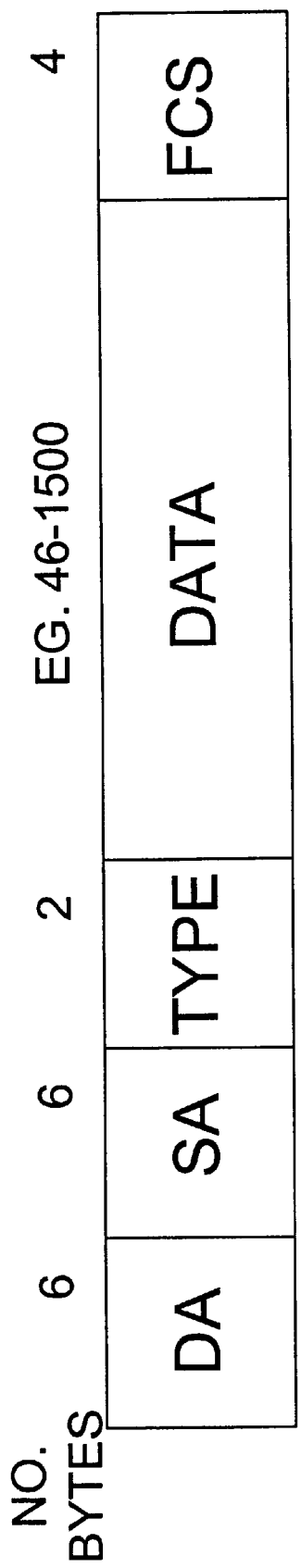
FIG. 1 illustrates the format of a data packet and how it may be altered.

In FIG. 1A there is shown a simple data packet in the Ethernet protocol. At the heart of the packet is the data which is to be communication (DATA) and this typically may be 46 to 1500 bytes in length. Ahead of the DATA are a portion specifying the destination address (DA) of the packet, a portion specifying the source address (SA) and a TYPE portion. TYPE may indicate certain parameters of the data packet, such as the type of communication it is and the length of the data portion of the packet. Herein, the portion of the data packet referred to thus far ie. DATA, DA, SA, TYPE, together with any other portions ahead of the FCS described below, are collectively referred to as communication data.

At the end of the packet in addition to the communication data is a Frame Check Sequence (FCS). This is derived by applying a predetermined mathematical algorithm to the bit sequence of the communication data to form 4 bytes of data which is appended to the communication data to complete the data packet. After a packet has been transmitted through a network segment it is possible for a suitably equipped receiving station to check the integrity of the received packet by applying the same mathematical algorithm to the received communication and determining if the result of that calculation is the same as the received FCS. If it is not, the packet is discarded as being corrupt. In the Ethernet protocol, the lack of an acknowledgement from the destination causes the source to re-send the packet, until such time as a suitable acknowledgement is received indicating that the packet is received uncorrupted.

Figure 1B:
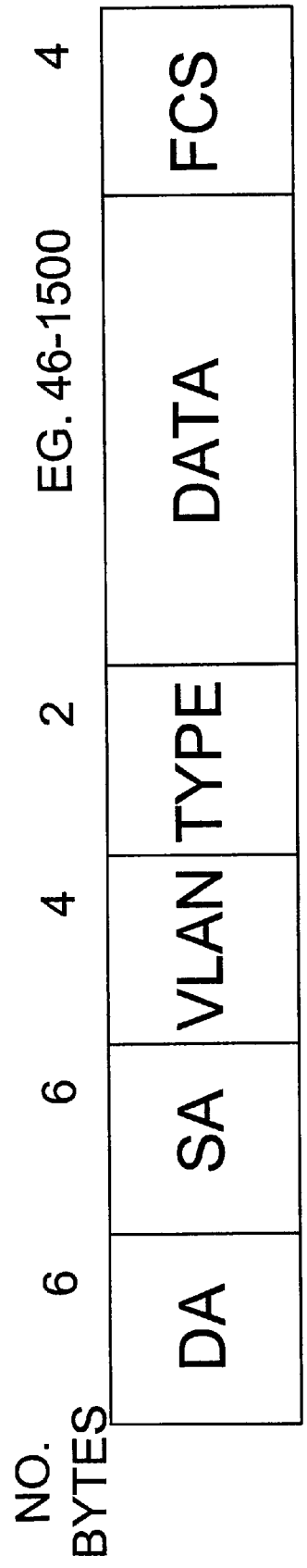

FIG. 1B illustrates the data packet of FIG. 1A after alteration of the communication data by insertion of an extra data portion in the form of a VLAN tag between SA and TYPE. Although in FIG. 1B, DA, SA, TYPE and DATA are each identical to the corresponding portion in FIG. 1A, the addition of the VLAN tag means that overall the communication data has altered. Therefore, in the properly formed data packets of FIG. 1, the FCS in FIG. 1B is different from the FCS in FIG. 1A reflecting the alteration in the communication data.

Any network apparatus which alters the communication data in a packet for instance by the insertion of a data portion as in a change from FIG. 1A to FIG. 1B or by the removal of a data portion as in a change from FIG. 1B to FIG. 1A, must re-calculate the FCS to take account of the change which has been made. It should also use the original FCS to check the integrity of the received data and this should be done as close to the forming of the new packet with the new FCS as possible. Any difference in the data paths through which the data passes for having the integrity checked on the basis of the original FCS and for calculating the new FCS introduces the potential for corruption of the data packet which would not be detected by the FCS arrangements.

FIG. 2 is a schematic diagram illustrating an example implementation of apparatus suitable to perform the above-discussed alteration of the communication data is a packet and to simultaneously check the integrity of the packet using the FCS. This embodiment is specifically adapted for the data packets and the changes discussed above in relation to FIG. 1.

At the heart of the embodiment illustrated in FIG. 2 is temporary storage means 20. In the preferred embodiment this is an 8 by 8 bit block of static ram (SRAM) having eight memory locations each capable of storing 1 byte (8 bits) of data. Data is input into memory 20 from 8-bit wide bus 22 and each byte which is received is stored at the memory location defined as the current write address by write pointer 32. It will be understood that the whole of the implementation illustrated in FIG. 2 is clocked by clock means not shown for clarity, thereby enabling the actions of the various parts of the apparatus to be synchronised according to the clock cycles.

Control means 30 controls write pointer 32 to increment the write address on each clock cycle. 1 byte of data is received from bus 22 by memory 20 each clock cycle and the received byte is stored in the next memory location from where the previous byte is stored as a result of the incrementing of the write address. When the write address reaches the top of memory 20 it cycles to the bottom such that memory 20 is in fact operated as a ring structure with new data always replacing old data once the memory is full and it is therefore the case that memory device 20 always contains the most recently received eight bytes from bus 22.

Bytes of data are applied to bus 22 by way of packet storage and alteration means 40 which operates under the control of control means 30. Means 40 comprises storage means 42 which is large enough to store an entire data packet which has been received and which is to be retransmitted. In this implementation, storage means 42 is implemented as SRAM 128 bits wide which is arranged to read out data via 128 bit wide bus 42a, 4:1 multiplexing means 43 and 32 bit wide bus 43a into 32 bit register 44. Data is arranged to be read out of 32 bit register 44 via 32 bit wide bus 44a into 5:1 multiplexing means 48. Multiplexing means 48 also receives input from 32 bit wide bus 46a and via this bus it receives the 32 bit VLAN tag from a VLAN tag register 46. Multiplexing means 48 is arranged to operate under the control of control means 30 to selectively read data from bus 44a, or bus 46a and to output the data in a byte-wise fashion onto bus 22 in a predetermined order as described in the following.

It should be noted in the above description that the particular construction of means 40 is provided simply by way of example and the parameters of means 40, such as the widths of the internal bus means, are not limiting and the significant feature of means 40 is that it is arranged to store and output a data packet as described in the following.

A received data packet, for instance either in the format of FIG. 1a of FIG. 1b, is stored in storage means 42. In the case that the received data packet is in the form of FIG. 1b and the alteration which is required to be applied to the packet is the removal of the VLAN tag, means 40 is arranged simply to output the packet as received byte by byte onto data bus 22. In the case that the received data packet stored in means 42 is of the form of FIG. 1a multiplexing means 48 applies the data packet in its received form to data bus 22 byte by byte until the point is reached at which the VLAN tag should be inserted. At this time the VLAN tag is read from VLAN tag register 46 and applied byte by byte to data bus 22, after which the remainder of the received data packet, including the original FCS, is applied byte by byte to data bus 22. As discussed previously, the operation of storage means 20 in conjunction with write pointer means 32 under the control of control means 30 means that at any time storage means 20 contains the most recently received eight bytes of data output from means 40.

While data is being written into memory means 20 via bus 22 data is also being read out of memory means 20 via 8 bit wide bus 24. The memory location which is being read out need not necessarily be the same memory location that is being written and therefore memory means 20 is supplied with both a write address and a read address.

Data bus 24 supplies data to transmit media access controller (TX MAC) and FCS generator 28 and also to FCS checker 26. As will be described in more detail in the following, TX MAC and FCS generator 28 are arranged to output the new data packet in its altered condition with an appropriate new FCS while FCS checker 26 is arranged to check the integrity of the received data packet. As both of these items receive their data from data bus 24 there is minimal opportunity for the data received by means 26 and means 28 to differ which would result in the above discussed problems of undetected corruption of the data.

As an alternative, it would be possible for memory means 20 to have two output ports and to supply means 26 and means 28 via separate data buses and this would reduce as compared to previous arrangements the possibility for such corruption to occur, but would still be leave open the possibility that data may be corrupted on one output port but not on the other.

As regards the timing of the reading out of the data from memory means 20 it is the case that 1 byte of data is read out to TX MAC and FCS generator 28 and 1 byte of data is read out to FCS checker 26 for each byte of data which is input via data bus 22. For reasons which will become apparent from the following description, it is not always the case that, in each clock cycle, it is required that the same byte should be received by means 28 and by means 26. For this reason, there are provided two registers 34, 36 which respectively store the currently required read address for the TX MAC and FCS generator 28 and for FCS checker 26. Output selector 38, which forms part of control means 30, acts to control multiplex means 35 and to enable or disable the inputs to means 28 and means 26 alternately. There are, as mentioned, two read cycles from memory means 20 for each write cycle, and in one of these read cycles the input to TX MAC and FCS generator 28 is enabled and the read pointer from TX read pointer register 34 is applied to memory means 20, and in the other cycle, the input to FCS checker 26 is enabled and the read address from FCS read point at register 36 is applied to memory means 20.

The reading out of the data with this offset continues and so the overall sequence of bytes received by FCS checker 26 is the data packet in its initial form, ie. without the VLAN tag and including the original FCS. This enables FCS checker 26 to test the integrity of the data packet on the basis of the original FCS. The overall sequence of bytes received by TX MAC and FCS generator 28 is the altered communication data of the data packet, ie. including the VLAN tag. From this data the new FCS required to complete the altered data packet is calculated for appending to the communication data.

Due to the offset introduced as mentioned above, the FCS checker 26 receives the final byte of the original FCS in the same clock cycle as TX MAC and FCS generator 28 receives the final byte of DATA. This coincidence itself is not vital, but what is significant is that it enables an indication to be given by FCS checker 26 in the event that its integrity check on the initial packet is negative before the completion of the new data packet by TX MAC and FCS generator 28. If such an indication is received, the TX MAC and FCS generator 28 can then corrupt at least part of the FCS of the new data packet, the start of which will already have been transmitted, such that the content of the packet will be ignored by a receiving section.

In the case where the initial packet is in the form of FIG. 1b and the alteration which is required is the extraction of the VLAN tag, the initial packet is, as described above, read into the storage means 20 in its received form, that is including the VLAN tag. In this case, the TX read pointer and the FCS read pointer are not set to be the same at the outset and in the preferred implementation the initial offset is as great as possible such that the first byte of the packet is read out to FCS checker 26 at the earliest possible time after it has been written from bus 22 while that byte is read out to TX MAC and FCS generator 28 at the latest possible time before it is over-written by the cyclic operation of memory means 20. This offset will be greater than four bytes and may be seven or even eight bytes depending on the exact sequence of operation of memory means 20 in each clock cycle.

In the same way as in the operation described above, the two read pointers are subsequently incremented for each clock cycle, maintaining the offset between them, such that DA and SA are read out to FCS checker 26 ahead of being read out to TX MAC and FCS generator 28. FCS read pointer continues to be incremented throughout the progress through the data packet such that the original VLAN tag and the original FCS are read out to FCS checker 26. However, at the point when TX read pointer reaches the end of SA, instead of being incremented in the normal way, it is increased by five, thereby by-passing the VLAN tag and causing the first byte of TYPE to be read out to TX MAC and FCS generator 28. In this way, the VLAN tag is removed from the packet which will be output. The offset between the two read pointers is therefore now reduced by 4 bytes from its initial value but the data is still being read out to FCS checker 26 ahead of being read out to TX MAC and FCS generator 28.

It will be appreciated that, as before, this arrangement means that the overall sequence of bytes received by FCS checker 26 is the data packet in its initial form, in this case with the VLAN tag and including the original FCS. This again enables FCS checker 26 to test the integrity of the data packet on the basis of the original FCS. The overall sequence of bytes received by TX MAC and FCS generator 28 is the altered communication data of the data packet, ie. without the VLAN tag. Form this data the new FCS required to complete the altered data packet is calculated for appending to the communication data.

Due to the remaining offset between the read pointers, it is still the case that the FCS checker 26 receives the final byte of the original FCS ahead of the completion of the new data packet by TX MAC and FCS generator 28. Once again then, if FCS checker 26 determines that the data packet does not have the required integrity, it can indicate this to TX MAC and FCS generator 28 before completion of the new data packet enabling the new data packet to be corrupted on output such that the content of the packet will be ignored by a receiving station.

It will be appreciated therefore that in this embodiment the insertion and removal of the VLAN tag or indeed any other portion of data, is facilitated, while the integrity of the original data packet is simultaneously checked. The potential for errors occurring such that corrupted data is transmitted as an apparently good packet is reduced because the data on the basis of which the integrity check is performed and the data which forms the new packet is the data which has been stored in memory means 20 and read out via data bus 24.

The significance of this is that the data which, overall, both form the initial data packet and is going to form the communications data of the new data packet is stored in a single storage means and can be output either in a form appropriate for the new data packet or in a form corresponding to the initial data packet. In the described embodiment, this is facilitated by the use of an addressable memory and appropriate control of the pointer in the memory.

What is claimed is:

1. Apparatus for the alteration and output of an input data packet in a computer network, the data packet comprising communication data, and check data, the check data bearing a predetermined relationship to the communication data whereby integrity of the data packet is checked, the apparatus comprising:

means arranged to alter the communication data of the input data packet;

storage means arranged to store said data packet such that said communication data may be output from said storage means in either an unaltered or altered condition;

output means arranged to receive from said storage means said communication data in its altered condition, to determine new check data on the basis of said communication data in its altered condition, and to output said communication data in an altered condition and said new check data as an output data packet; and checking means arranged to receive from said storage means said communication data in its un-altered condition and said check data of said input packet, to determine whether said received check data bears said predetermined relationship to said un-altered communication data, and to give an indication, if it does not to said output means;

said output means being further arranged to corrupt said output data packet if said indication is received.

2. Apparatus according to claim 1 and further comprising timing means arranged to control the relative timing of the output of data from said storage means to said output means and to said checking means such that said indication, if given by said checking means, occurs prior to the completion of the determination of said new check data.

3. Apparatus according to claim 1 in which said storage means comprises a first memory device arranged to store said data packet in its un-altered condition, and a second memory device having a plurality of memory locations into which data is written cyclically such that the existing data is sequentially over-written by new data and from which data can be read from desired ones of said memory locations; and further comprising control means arranged to control the operation of the storage means such that the data of the un-altered data packet stored in said first memory device together with any additional data introduced by said means arranged to alter the communication data is read sequentially into said second memory device, and to control the locations from which data is read out from said second memory device to said output means and to said checking means such that the communication data of the data packet is received in its altered condition by said output means and in its un-altered condition by said checking means.

4. Apparatus for the alteration and output of an input data packet in a computer network, the data packet comprising communication data and check data, the check data bearing a predetermined relationship to the communication data whereby integrity of the data packet can be checked; the apparatus comprising:

storage means arranged to store said input data packet;

output means arranged to receive from said storage means said communication data of said input data packet with the exception of a predetermined portion of said communication data to form new communication data of an output data packet, and to determine new check data on the basis of said new communication data to complete said output data packet; and checking means arranged to receive from said storage means said communication data and check data of said input data packet, to determine whether said received check data bears said predetermined relationship to said communication data, and to give an indication, if it does not, to said output means;

said output means being further arranged to corrupt said output data packet if said indication is received.

5. Apparatus according to claim 4 and further comprising timing means arranged to control the relative timing of the output of data from said storage means to said output means and to said checking means such that said indication, if given by said checking means, occurs prior to the completion of the determination of said new check data.

6. Apparatus according to claim 5 in which said storage means comprises a first memory device arranged to store said input data packet, and a second memory device having a plurality of memory locations into which the data forming said input data packet is written cyclically such that existing data is sequentially over-written by new data and from which data can be read out from desired ones of said memory locations; and said timing means controls first and second read pointers defining the memory locations from which respectively data is being read out to said output means and said checking means, comprising setting an initial offset between and subsequently incrementing said first and second read pointers such that the data of said input data packet is sequentially read out to said checking means ahead of being read out to said output means, and at an appropriate point moving said first read pointer such that said predetermined portion of said communication data is not read out to said output means, said offset being set such that all of said check data of said input data packet is read out to said checking means before the completion of the determination of the of said new check data.

7. Apparatus for the alteration and output of an input data packet in a computer network, the data packet comprising communication data and check data, the check data bearing a predetermined relationship to the communication data whereby integrity of the data packet can be checked; the apparatus comprising:

storage means arranged to store said input data packet and a further data portion to be inserted into the communication data of said input data packet at a predetermined location;

output means arranged to receive from said storage means said communication data of said input data packet with said data portion inserted at said predetermined location to form new communication data of an output data packet, and to determine new check data on the basis of said new communication data to complete said output data packet; and checking means arranged to receive from said storage means said communication data and check data of said input data packet, to determine whether said received check data bears said predetermined relationship to said communication data, and to give an indication, if it does not, to said output means;

said output means being further arranged to corrupt said output data packet if said indication is received.

8. Apparatus according to claim 7 and further comprising timing means arranged to control the relative timing of the output of data from said storage means to said output means and to said checking means such that said indication, if given by said checking means, occurs prior to the completion of the determination of said new check data.

9. Apparatus according to claim 8 in which said storage means comprises a first memory device arranged to store said input data packet and said further data portion, and a second memory device having a plurality of memory locations into which the communication data of said input data packet with said further data portion inserted at said predetermined location and said check data of the input data packet is written cyclically such that existing data is sequentially over-written by new data and from which data can be read out from desired ones of said memory locations; and said timing means controls first and second read pointers defining the memory locations from which respectively data is being read out to said output means and said checking means, comprising setting an initial offset between and subsequently incrementing said first and second read pointers such that the data of said input data packet is sequentially read out to said checking means ahead of being read out to said output means, and at an appropriate point moving said second read pointer such that said further data portion is not read out to said checking means, said offset being set such that all of said check data of said input data packet is read out to said checking means before the completion of the determination of the of said new check data.

* * * * *